United States Patent [19]

Ditto, deceased et al.

[11] 4,349,047
[45] Sep. 14, 1982

[54] FLOW PLUG

[76] Inventors: Fred S. Ditto, deceased, late of Calgary, Canada; by Teresa M. Ditto, executrix, 135 Whitewood Pl. NE., Calgary, Alberta, Canada, T1Y 3S8

[21] Appl. No.: 207,557

[22] Filed: Nov. 17, 1980

[30] Foreign Application Priority Data

Nov. 15, 1979 [CA] Canada .................................. 339886

[51] Int. Cl.³ .............................................. F16L 55/12
[52] U.S. Cl. ........................................ 138/93; 138/89; 166/187
[58] Field of Search ...................... 138/89, 93; 166/63, 166/64, 152, 187

[56] References Cited

U.S. PATENT DOCUMENTS

| 3,483,895 | 12/1969 | Barto | 138/93 X |
|---|---|---|---|
| 3,538,330 | 11/1970 | Youmans | 166/187 X |
| 3,870,085 | 3/1975 | Schneider | 138/93 |
| 3,884,261 | 5/1975 | Clynch | 138/93 X |
| 3,902,528 | 9/1975 | Tartabini et al. | 138/93 X |
| 3,990,464 | 11/1976 | Jenkins | 138/93 X |
| 4,021,265 | 5/1977 | Guenther | 138/93 X |
| 4,026,329 | 5/1977 | Thompson | 138/93 X |
| 4,272,984 | 6/1981 | Bell | 138/93 X |

Primary Examiner—James E. Bryant, III
Attorney, Agent, or Firm—George H. Dunsmuir; William R. Hinds

[57] ABSTRACT

A plug for a passage such as a shot hole in the ground, a pipe or a tube includes an inflatable flexible sleeve closed at each end by a rigid plug, the plugs being interconnected by a metal pipe, with a compressed air cylinder in the pipe closed by an electrical valve which can be opened by a battery power pack separate from the plug to permit air under pressure to escape into the pipe and through apertures therein into the sleeve, inflating the latter to seal the passage.

5 Claims, 8 Drawing Figures

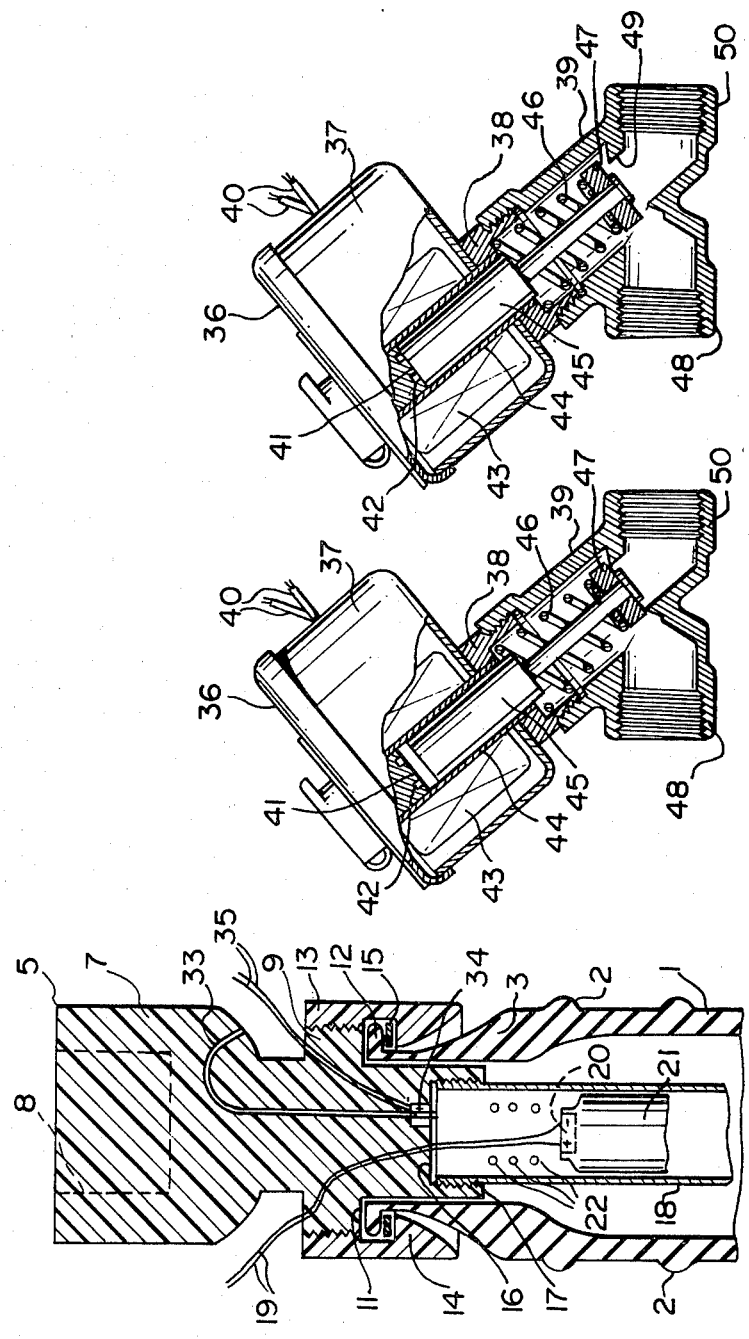

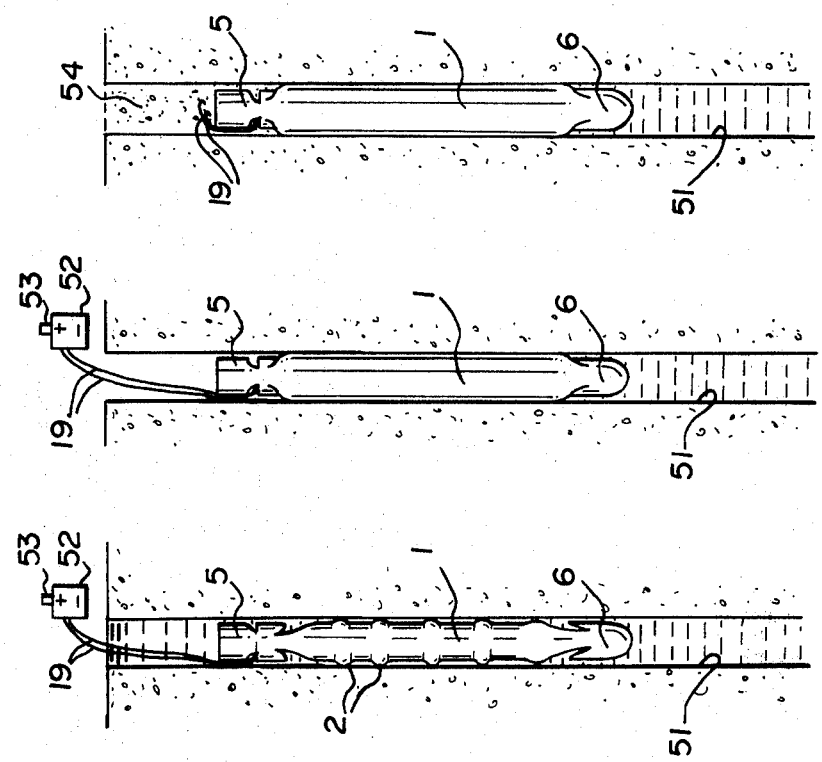

FLOW PLUG

BACKGROUND OF THE INVENTION

This invention relates to a plug for a cylindrical passage and in particular to a self contained, inflatable plug for stopping the flow of fluid from a cylindrical pipe, tube or hole in the ground.

Often when drilling holes in the ground, e.g. shot holes for explosives, water is encountered. The water may be under high pressure and flow to the surface, flooding the surrounding area. One method of dealing with the problem is to place an inflatable plug in the hole and inflate the plug to block or seal the hole. In accordance with one current practice, an inflatable plug is placed in the hole and air from a truck mounted compressor is pumped into the plug through tubing connecting the plug to the surface. The method has certain drawbacks such as the expense of the equipment, and the time and difficulty of transporting the equipment and operating personnel to the site.

Other hole sealing plugs are disclosed by U.S. Pat. Nos. 2,671,510 issued to T. B. Slick et al on Mar. 9, 1965; 3,491,798 issued to J. J. Beshara on Jan. 27, 1970; and 3,918,520 issued to S. O. Hutchison on Nov. 11, 1975. The Slick patent discloses a well packer which is inflated by gas generated by an explosion within a cylinder. Beshara proposes an expansible plug which is caused to expand by the detonation of an explosive charge. The Hutchison patent describes a well packer containing a high pressure gas, which is released to expand the packer by a valve controlled by a sequencing timer actuating device.

From a review of the prior art methods and apparatus, it is readily apparent that there exists a need for a simple yet effective plug for stopping the flow of fluid from a cylindrical passage, e.g. a shot hole. The object of the present invention is to at least alleviate the problems referred to hereinbefore by providing a relatively simple, self-contained plug for cylindrical passages. By self-contained is meant a device which can readily be carried to a hole site without any heavy accessory equipment such as a compressor.

BRIEF SUMMARY OF THE INVENTION

Accordingly, the present invention relates to an expansible plug for a cylindrical passage comprising a flexible sleeve open at each end thereof, said sleeve being expensible under the influence of internal gas pressure; substantially rigid end caps closing the ends of said sleeve; pipe means extending between said end caps for maintaining the sleeve in elongated condition during insertion of the deflated plug into a passage; a compressed gas container in said pipe means; electrically operated valve means normally closing said container; electrical leads extending from said valve means through one end cap for connection to a source of electrical power for opening said valve means, permitting the escape of gas under pressure into said pipe means; and discharge openings in said pipe means permitting the flow of such gas under pressure into said sleeve to expand the plug, thereby sealing the passage.

BRIEF DESCRIPTION OF THE DRAWINGS

The invention will now be described in greater detail with reference to the accompanying drawings, which illustrate two preferred embodiments of the invention, and wherein;

FIG. 3 is a longitudinal sectional view of the upper end of a second embodiment of the plug of the present invention.

FIGS. 4 and 5 are schematic, partly sectioned views of a valve for use in the plug of FIGS. 1 to 3; and FIGS. 6 to 8 are schematic cross-sectional views of a hole in the ground with a plug in accordance with the present invention, in place.

DESCRIPTION OF THE PREFERRED EMBODIMENT(S)

Figure 1:
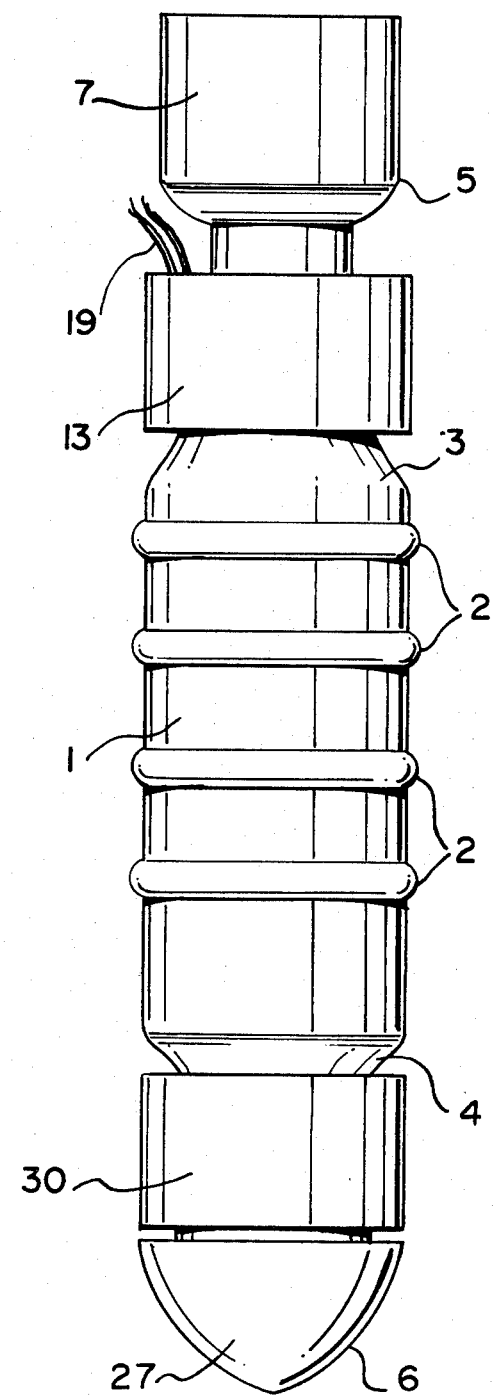
FIG. 1 is a side view of a plug in accordance with the present invention.
Figure 2:
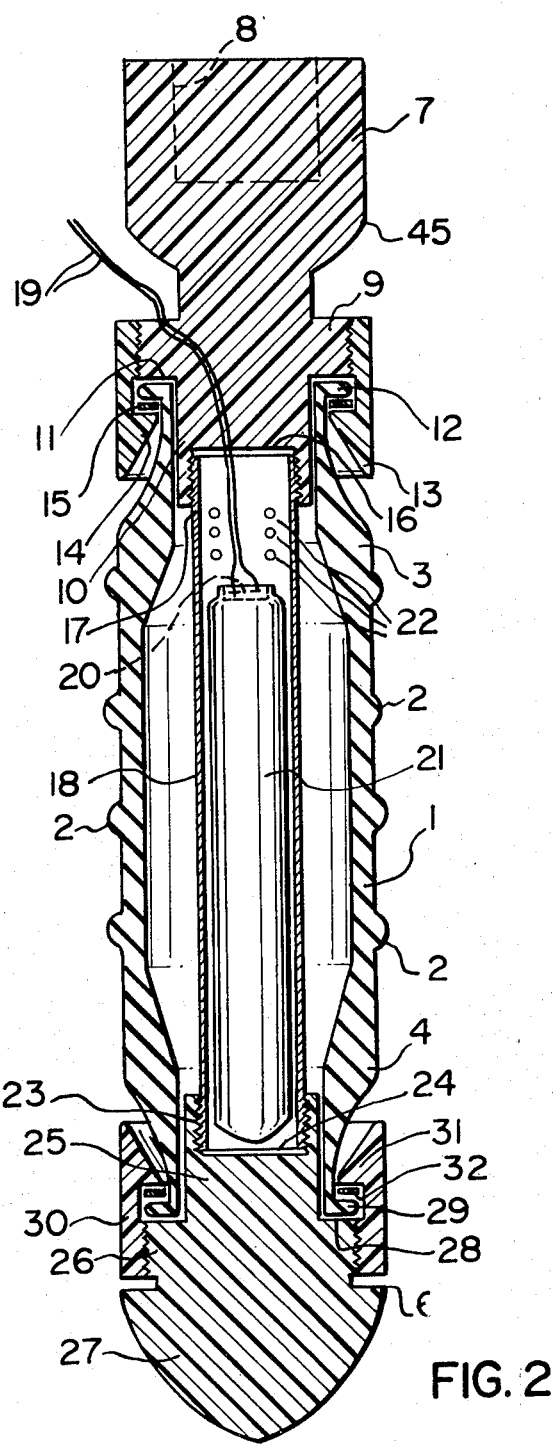
FIG. 2 is a longitudinal sectional view of the plug of FIG. 1.

With reference to FIGS. 1 and 2, a plug in accordance with the present invention includes an inflatable, elongated sleeve 1 formed of a flexible material such as rubber. The sleeve is provided with a plurality of spaced apart, annular projections 2 on its exterior surface for forming a seal with a passage, as described hereinafter. The sleeve 1 preferably has a wall thickness such that the diameter of the sleeve can increase threefold before reaching the bursting point. The sleeve is open at its upper and lower ends 3 and 4, respectively and such ends are closed by caps 5 and 6, respectively. The upper and lower ends of the sleeve are restricted for receiving the caps 5 and 6. Moreover, the wall thickness of the sleeve 1 at such upper and lower ends 3 and 4 respectively is much greater than elsewhere to prevent expansion of the sleeve 1 during inflation around the end caps 5 and 6.

The top cap 5 is defined by an elongated body, which includes a head 7 with a cylindrical recess 8 therein for receiving one end of a rod (not shown) or the like for pushing the plug into a passage. The head of the cap 5 is integral with a wide, externally threaded central portion 9 and a narrower bottom portion 10. The bottom portion 10 is inserted into the open upper end 3 of the sleeve 1 until a radially extending shoulder 11 between the central and bottom portions 9 and 10 of the cap abuts against an outwardly extending peripheral flange 12 on the upper end of the sleeve.

The cap 5 is retained on the sleeve 1 by an internally threaded locking ring 13, which is provided with an inwardly extending annular flange 14 at its lower end for sandwiching the flange 12 of the sleeve 1 against the shoulder 11. A washer 15 is provided between the flanges 12 and 14 for ensuring a fluid tight seal. The bottom portion 10 of the cap 5 includes an internally threaded cylindrical recess 16 for retaining threaded top end 17 of an elongated pipe 18.

Electrical leads in the form of a pair of wires 19 are embedded in and extend through the central and bottom portions 9 and 10 respectively of the cap 5. The wires 19 are connected to a valve 20, which normally closes the top end of a compressed air cylinder 21 in the pipe 18. The pipe 18 is provided with a plurality of apertures 22 in the upper end thereof above the top end of the cylinder 21 for discharging air into the sleeve 1. In some cases, it is desirable to use a non-compressible liquid in the space between the sleeve 1 and the pipe 18, the liquid acting as a filler so that a relatively small quantity of gas under pressure is required to inflate the plug. The pipe 18 and cylinder 21, extend downwardly to the bottom end of the sleeve 1, the pipe 18 acting as a rigid core for the plug.

The bottom end 23 of the pipe 18 is externally threaded for mating with a threaded cylindrical recess 24 in the upper end 25 of bottom cap 6. The bottom cap 6 is also defined by an elongated body, which includes the upper end 25, a central externally threaded portion 26 and a generally cone-shaped lower portion 27. The upper end 25 of the cap 6 is inserted into the open lower end 4 of the sleeve 1 until a radially extending shoulder 28 between the upper end 25 and central portion 26 of the cap 6 engages an outwardly extending flange 29 on the bottom end of the sleeve 1. The cap is retained on the sleeve 1 by an internally threaded locking ring 30 which is the same as locking ring 13. The locking ring 30 includes an inwardly extending annular flange 31 for sandwiching the flange 29 of the sleeve 1 against the shoulder 28. A washer 32 is provided between the flanges 29 and 31 for ensuring a fluid tight seal. The downwardly tapering lower portion 27 of the bottom cap 6 facilitates insertion and centering of the plug in a passage.

Referring to FIG. 3, the second embodiment of the invention is the same as the embodiment of FIGS. 1 and 2, except that means are also provided for deflating the sleeve 1 so that the plug can be removed from a passage for re-use. Such means includes an outlet passage 33 extending upwardly through the top cap 5 from the top end of the pipe 18 and venting to the atmosphere. The outlet passage 33 is normally closed by an electrical valve 34, which may be molded into the bottom portion 10 of the cap 5. Wires 35 are provided for connecting the valve 34 to a source of power for opening and closing the valve.

The valves 20 and 34 may be off the shelf items. There are many conventional electrically operated valves that could be used. Typical of such valves is the one illustrated in FIGS. 4 and 5. The valve is manufactured by Ascolectric Limited of Brantford, Ontario. The valve includes a casing 36 defined by a box 37, coupling sleeve 38 and main body 39. Wires 40 extending into the casing may be connected to the wires 19 or 35 which connect the valve to a power supply. The casing houses a stationary core 41, a shading coil 42, solenoid coil 43, a core tube 44, movable core 45, spring 46 and a disc 47 on the movable core 45. When current is supplied to the valve in the closed position (FIG. 4) via wires 40, the core 45 is caused to move against the spring 46 to open the valve (FIG. 5) which permits compressed air to escape through inlet duct 48, valve opening 49 and outlet duct 50 of the main valve body 39 for inflating (or deflating) the plug. When current ceases to flow to the valve, the spring 46 returns the core 45 and the disc 47 to the closed position.

The operation of the plug will now be described with reference to FIGS. 6 to 8. When a hole 51 drilled into the earth fills with water and it is decided to plug the hole permanently, a deflated plug in accordance with FIGS. 1 and 2 of the present invention is forced down into the hole (FIG. 6) manually or by means of a rod or pole (not shown). The wires 19, which extend upwardly out of the hole 51 are connected to a battery power pack 52. A push button switch 53 on the power pack 52 is pressed to open the valve 20. Compressed air escapes via apertures 22 in the pipe 18 into the sleeve 1, to inflate the latter to the fully inflated condition (FIGS. 7 and 8). Water can be removed from above the plug (FIG. 7). the wires 19 disconnected or cut and the hole backfilled with earth 54 to seal the hole.

While the foregoing description is limited to the use of the plug in a hole in the ground, it will be appreciated that the plug can be used in virtually any passage, such as a water, oil or gas pipeline. One possible use of the plug is to seal one section of pipeline using two plugs at spaced apart points in the line, while the section of pipeline between the plugs is repaired. The deflatable version of the plug could also be used in one end of pipelines as a temporary cap during installation of the pipelines.

While the types of materials that may be used in the plug are numerous, a hard plastic like material is best suited for the top and bottom caps. The use of a molded plastic top cap with the wires molded into the cap prevents the escape of compressed air via the top cap. In the deflatable version of the plug the outlet valve can be molded into the plastic.

What is claimed is:

1. An expansible plug for a cylindrical passage comprising a flexible sleeve open at each end thereof, said sleeve being expansible under the influence of internal gas pressure; substantially rigid end caps closing the ends of said sleeve; pipe means extending between said end caps for maintaining the sleeve in elongated condition during insertion of the deflated plug into a passage; a compressed gas container in said pipe means; first electrically operated valve means normally closing said container; electrical leads extending from said valve means through one end cap for connection to a source of electrical power for opening said valve means; permitting the escape of gas under pressure into said pipe means; and discharge openings in said pipe means permitting the flow of such gas under pressure into said sleeve to expand the plug, thereby sealing the passage.

2. A plug according to claim 1, including an outlet passage in said one end cap for venting said sleeve to the atmosphere to permit deflation of the expanded plug; said electrically operated valve means normally closing said outlet passage; and electrical leads extending from said second valve means through said one end cap for connection to a source of electrical power for opening and closing the second valve means.

3. A plug according to claim 1, wherein said one end cap includes an outer portion; a recess in the outer end of said outer portion for receiving a rod or the like to facilitate insertion of the plug into a passage; an externally threaded central portion; an internally threaded locking ring for attachment to said central portion to connect the one end of the sleeve to said one end cap; and an internally threaded inner portion for receiving and retaining one end of said pipe means.

4. A plug according to claim 1, 2 or 3, wherein the other end cap includes an internally threaded inner portion for receiving and retaining the other end of said pipe means; an externally threaded central portion; an internally threaded locking ring for attachment to said central portion to connect the other end of said sleeve to said other end cap; and an outwardly tapering outer portion facilitating insertion of the plug into a passage.

5. A plug according to claim 1, 2 or 3, wherein said sleeve is capable of expanding to approximately three times its diameter in the unexpanded condition.

* * * * *